United States Patent [19]

Tokumaru et al.

[11] Patent Number: 4,720,605
[45] Date of Patent: Jan. 19, 1988

[54] CABLE CLOSURE

[75] Inventors: Yuzo Tokumaru; Yuya Iwamoto, both of Yokohama, Japan

[73] Assignee: Sumitomo Electric Industries, Ltd., Osaka, Japan

[21] Appl. No.: 901,399

[22] Filed: Aug. 28, 1986

[30] Foreign Application Priority Data

Sep. 27, 1985 [JP] Japan .................. 60-148822[U]

[51] Int. Cl.[4] .................................... H02G 15/08
[52] U.S. Cl. .................. 174/93; 174/77 R; 174/92
[58] Field of Search ............ 174/77 R, 92, 93

[56] References Cited

U.S. PATENT DOCUMENTS

| | | | |
|---|---|---|---|
| 3,775,204 | 11/1973 | Thompson et al. | 174/92 X |
| 3,796,823 | 3/1974 | Wright et al. | 174/92 |
| 3,798,349 | 3/1974 | Thompson et al. | 174/92 |
| 4,216,351 | 8/1980 | Brandeau | 174/92 |
| 4,237,335 | 12/1980 | Giebel et al. | 174/92 |

FOREIGN PATENT DOCUMENTS

| | | | |
|---|---|---|---|
| 1640719 | 8/1970 | Fed. Rep. of Germany | 174/93 |
| 2050536 | 12/1971 | Fed. Rep. of Germany | 174/92 |
| 3240339 | 5/1984 | Fed. Rep. of Germany | 174/77 R |

Primary Examiner—Morris H. Nimmo
Attorney, Agent, or Firm—Cushman, Darby & Cushman

[57] ABSTRACT

A closure with improved sealing end surface plates for enclosing connecting portions of a plurality of sizes of a communication cable. The closure includes a sleeve-like closure body divided longitudinally into portions. The two portions are fastened and sealed. Grooves are formed on an inner surface of the closure body at opposite ends thereof to accommodate the sealing end surface plates interposed between the cable and the closure body. Each of the sealing end surface plates includes an annular rubber end plate and a pair of plastic side plates.

2 Claims, 9 Drawing Figures

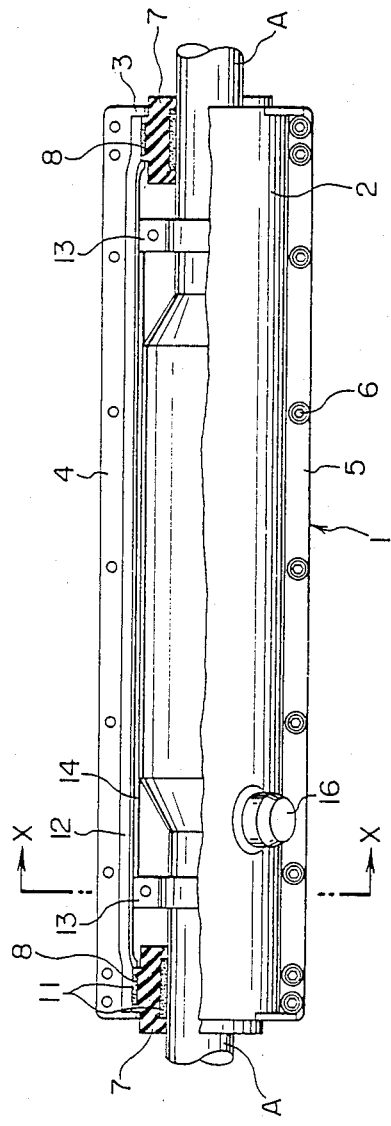
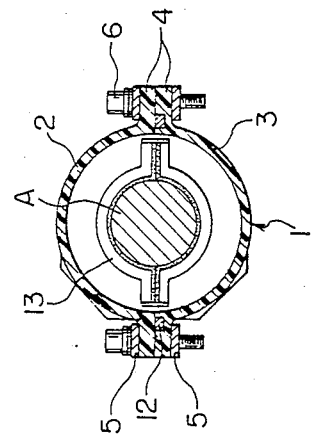
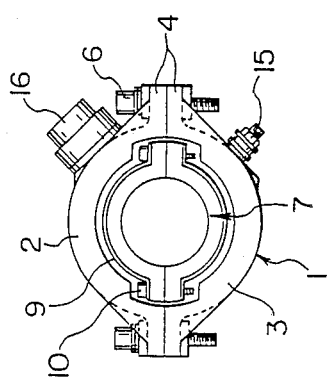

CABLE CLOSURE

BACKGROUND OF THE INVENTION

The present invention generally relates to a closure which encloses a connecting portion of a communication cable. The closure device according to the present invention relates to sealing an end of the closure and surrounding a cable inlet.

An example of a known communication cable closure is shown in FIGS. 1-3 (Prior Art). A closure body 1 includes a pair of semi-cylindrical molded plastic members 2 and 3. The semi-cylindrical members are positioned so as to be in opposition to each other. Flanges 4 are provided at the respective side edges of the semi-cylindrical members and are fastened by means of bolts 6 through reinforcing plates 5, attached along flanges 4. End surface plates 7, made of synthetic rubber, are fixed in annular grooves 8 formed along the respective inner surfaces of closure body 1 in the vicinity of the opposite end portions thereof. Each of the end surface plates 7 is interposed between a lead-in cable A and closure body 1. Fastening bands 9 are provided for fixing each end surface plate 7, by means of bolts 10, onto the outer periphery of cable A. Each plate 7 is divided diametrically into two "split" portions. A sealing material 11 is filled into, and maintained in grooves formed in, the inner and outer peripheries of end surface split plates 7 to maintain them air-tight. Sealing members 12 are fitted into grooves formed in one of the members 2 and 3 to seal the abutting surfaces thereof. Metal holders 13 are provided for grasping outer sheaths of the respective cables. Connection bars 14 are provided for connecting metal holders 13 at opposite sides. Additionally a gas enclosing valve 15 and/or a bond terminal 16 may also be attached to closure body 1 if necessary.

The thus arranged end portions of conventional closures, as shown in FIGS. 1-3 (PRIOR ART), have disadvantages in economy as well as in parts management. Since moldings of synthetic rubber are used for the end surface plates 7, it is necessary to prepare several kinds of end surface split plates having holes of various diameters which match the outer diameters of the various size cables to be joined.

Further in a closure in which a gas enclosing valve or a bond terminal is provided, there is another disadvantage to the known closure. Since the valve or bond terminal is provided in the outer periphery of the closure body as shown in the drawings, there is an inefficient use of the setting space of the closure body.

SUMMARY OF THE INVENTION

The object of the present invention is to solve the above-discussed problems.

According to the present invention, the configuration of the end surface plates is improved over that of the known closures. Each of the end surface plate, for sealing gaps between the closure body and the respective cables being joined, is constituted by an annular rubber end plate, a plurality of inserted sleeves passed through the end plate in the axial direction of the cables and embedded therein at predetermined circumferential locations, and a pair of plastic side plates tightly attached on the opposite surfaces of the rubber end surface plate by means of screws screwed into the insertion sleeves, so that a hole corresponding to the outer diameter of a cable is formed in the plastic side plates.

Unlike those made of rubber, the plastic side plates can be formed with a cable hole accurately in situ. According to the present invention, when side plates having cable holes matching the outer diameter of a cable are attached tightly on the opposite surfaces of the rubber side plate, a sealing agent filling/keeping space is inevitably defined by the pair of side plates, the inner surface of the cable hole of the rubber end plate, and cable independent of the diameter of the cable, so that it is possible to accommodate variations in cable size by using an end surface plate corresponding to the cable size.

Further, if the opposite end screw holes of any one of the insertion sleeves are continued to form a through hole, the outside and the inside of the closure are communicated with each other through the through hole. Thus, it is made possible to reduce the size of the outer diameter of a closure, which needs a valve or the like, by screwing a gas enclosing valve or a bond terminal into the outer end of the insertion nut having the through screw hole.

BRIEF DESCRIPTION OF THE DRAWINGS

FIG. 1 is a partially cut away side view showing a conventional closure.

FIG. 2 is an end view of a conventional closure.

FIG. 3 is a cross-section taken on line X—X of FIG. 1.

DETAILED DESCRIPTION OF THE PREFERRED EMBODIMENT

FIGS. 4 through 9 show a preferred embodiment of the present invention.

The closure arrangement is different from the conventional closure shown in FIGS. 1-3 (PRIOR ART), particularly in the structure of the end surface plates and in the positioning of the gas enclosing valve and the bond terminal.

Figure 7:
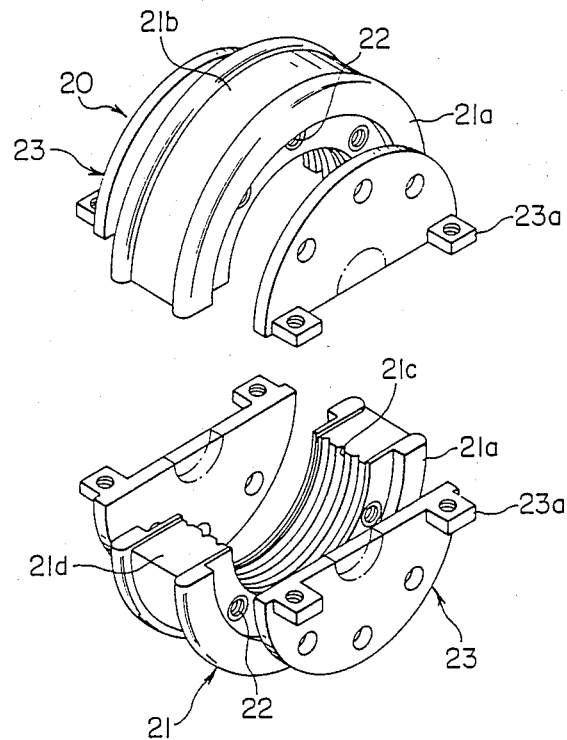
FIG. 7 is an exploded perspective view of the end surface plate.
Figure 8:
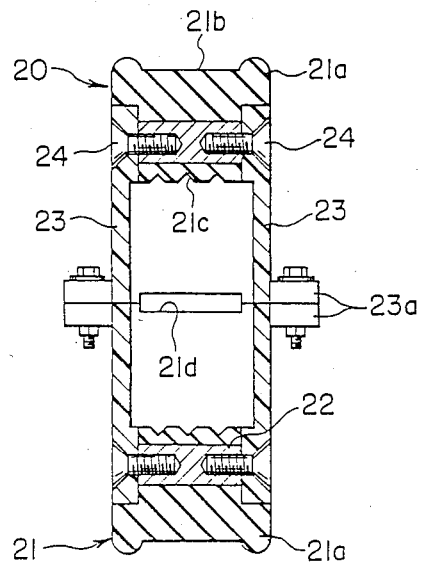
FIG. 8 is a radial cross-section of the same.
Figure 9:
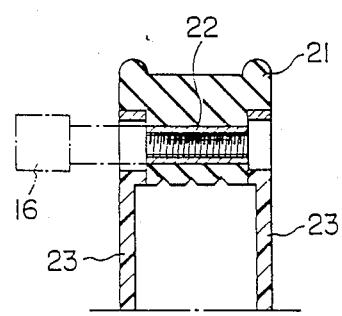
FIG. 9 is a cross-section of the main portion of the end surface plate.

As seen in FIGS. 7 and 8, an end surface plate 20 comprises an end plate 21 formed by combining a pair of semi-annular rubber members 21a. A plurality of insertion sleeves 22, each having screw holes in the opposite sides thereof, pass through the end plate 21 in the axial direction of the cable. A pair of plastic side plates 23 are attached to opposite surfaces of the end plate, and screws 24 are screwed into the screw holes corresponding to the insertion sleeves so as to fix the side plates to the end plate.

End plates 21 are arranged such that the hole diameter thereof is selected so as to be able to accommodate a cable having the largest possible diameter among various cables which can be protected by the closure. Sealing agents, filing semi-annular grooves 21b and 21c, are placed along the outer and inner peripheries of the rubber members 21a so that the respective semi-annular grooves 21b and 21c are essentially continuous with each other when the pair of rubber members 21a are abutted to each other. Further, sealing agent accommodating grooves 21d are formed in the mutually abutting surfaces of rubber members 21a so as to communicate sealing agent between grooves 21b and 21c.

Each of the pair of side plates 23 is diametrically divided into two divisional members in a similar fashion to the manner in which end plate 21 is divided. The side plates are arranged such that the two divisional members forming a side plate 23 are connected with each other by fastening projections 23a correspondingly provided on the divisional members with nuts and bolts inserted therein. Side plate 23 is fastened to rubber member 21a by screws 24, so that the pair of rubber members 21a are connected integrally with side plates 23.

Although being constituted by two divisional members to facilitate the attachment/detachment thereof to/from a cable, each of end plates 21 and each of the side plates 23 may be an integral annular end plate and-/or a circular side plate which is not divided into two components. However, side plate 23 is made without a cable insertion hole so that a cable insertion hole can be made corresponding to the size of cable at the site of the cable connection work.

Figure 4:
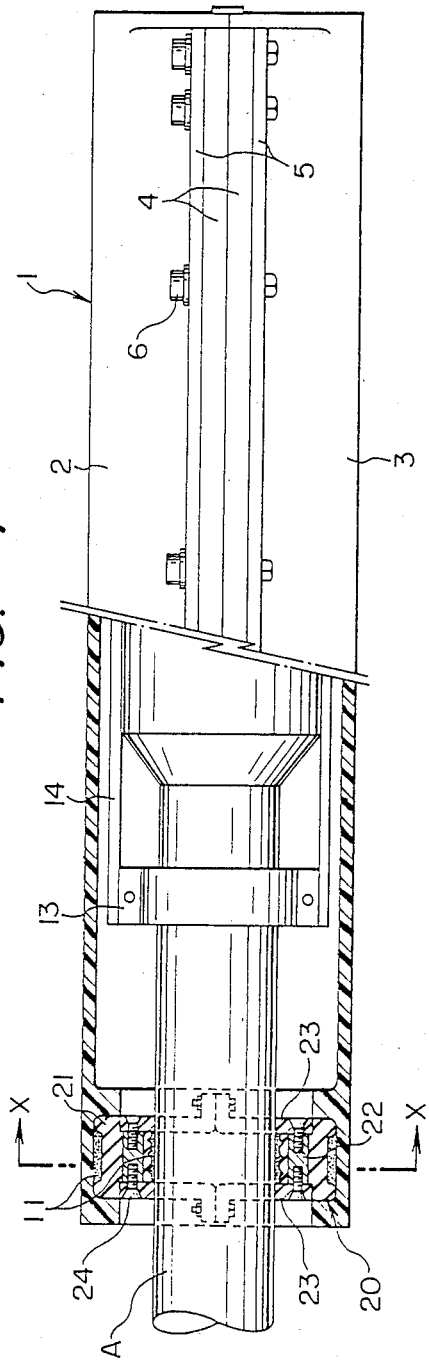
FIG. 4 is a partially cut away side view showing an embodiment of the closure according to the present invention.
Figure 6:
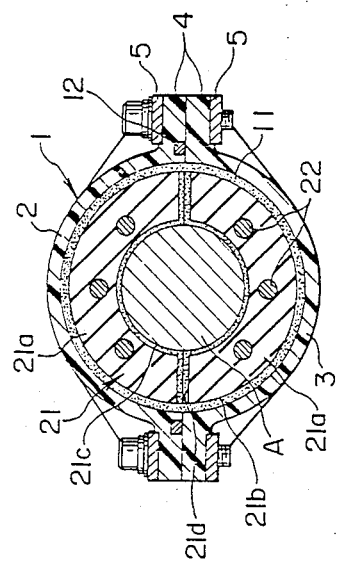
FIG. 6 is a cross-section taken on line X—X of FIG. 1.
Figure 5:
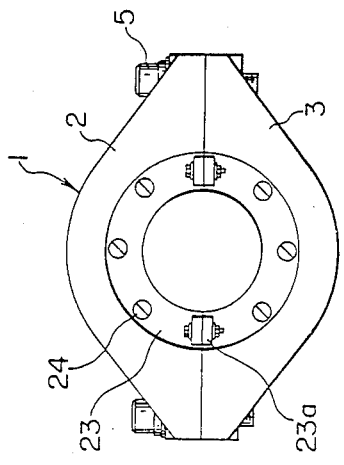
FIG. 5 is an end view of the same embodiment shown in FIG. 4.

Using the above mentioned arrangement, it is possible to make the inner surface of the cable insertion hole of each of side plates 23 tightly contact with the outer sheath of cable A as shown in FIG. 4 independently of variations in cable size. Further, the sealing agent 11 is held firmly in the space between cable A, the opposite side plates 23, the end plate 21, to thereby render the space air tight. Therefore, it is not necessary to replace end surface plates as a function of cable size.

Further, if the opposite end screw holes of any one the insertion nuts 22 are continued to be a through screw hole, it is made possible to attach a gas enclosing valve 15 or a bond terminal 16 at the outer end of the through screw hole without projecting out of the outer periphery of the closure, so that the closure which needs a valve or the like can be reduced in its radial dimension.

According to the present invention, a hole corresponding to a diameter of a cable is formed in plastic side plates which are fixed on the opposite surfaces of the rubber end plates by using insertion nuts and screws, so that a sealing agent filling/keeping space is defined around the outer periphery of a cable, independently of the diameter of a cable, to thereby make it possible to seal an inlet for cables having different diameters merely by using an end surface plate of one and the same size.

We claim:

1. A cable closure end sealing device comprising:
   a sleeve-like rubber body having first and second portions each portion being substantially one half of said sleeve-like body divided longitudinally;
   each of said sleeve-like body portions having a plurality of insertion sleeves passed through and embedded in a circumferential portion of said body portions at predetermined circumferential locations, and a pair of plastic side plates having an insertion hole for a cable, said pair of plastic side plates being attached tightly on opposite end surfaces of said rubber body portions by screws screwed into said insertion sleeves.

2. A cable closure end sealing device according to claim 1, wherein said pair of plastic side plates is constituted by first and second portions, each portion being substantially one half of said plastic side plate divided diametrically, each of said plastic side plates being provided with means for fastening said halves thereof to each other.

* * * * *